(12) United States Patent
Kostin et al.

(10) Patent No.: US 10,059,227 B2
(45) Date of Patent: Aug. 28, 2018

(54) ADJUSTING SYSTEM FOR A VEHICLE SEAT

(71) Applicant: Brose Fahrzeugteile GmbH & Co. Kommanditgesellschaft, Coburg, Coburg (DE)

(72) Inventors: Sergej Kostin, Coburg (DE); Michael Flieger, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 14/767,526

(22) PCT Filed: Feb. 11, 2014

(86) PCT No.: PCT/EP2014/052572
§ 371 (c)(1),
(2) Date: Nov. 19, 2015

(87) PCT Pub. No.: WO2014/124908
PCT Pub. Date: Aug. 21, 2014

(65) Prior Publication Data
US 2016/0082863 A1    Mar. 24, 2016

(30) Foreign Application Priority Data
Feb. 13, 2013   (DE) ........................ 10 2013 202 327

(51) Int. Cl.
*B60N 2/02* (2006.01)
*B60N 2/06* (2006.01)

(52) U.S. Cl.
CPC .......... *B60N 2/0232* (2013.01); *B60N 2/067* (2013.01); *B60N 2002/024* (2013.01); *B60N 2002/0236* (2013.01)

(58) Field of Classification Search
CPC ................. B60N 2/0232; B60N 2/067; B60N 2002/0236; B60N 2002/024; B60N 2002/0288
USPC ..... 248/424, 429; 297/144, 284.3, 311, 330, 297/344.1, 362
See application file for complete search history.

(56) References Cited

U.S. PATENT DOCUMENTS 2,865,427 A    12/1958   Garfield
4,432,525 A    2/1984    Duvall
(Continued)

FOREIGN PATENT DOCUMENTS

DE    7145433     7/1973
DE    29 25 781   1/1981
(Continued)

*Primary Examiner* — Muhammad Ijaz
(74) *Attorney, Agent, or Firm* — Lewis Roca Rothgerber Christie LLP

(57) ABSTRACT

An adjustment system for a vehicle seat with two rail pairs aligned in longitudinal vehicle direction, which are connected with each other via a carrier element oriented in transverse vehicle direction, which carries an electromotive driving device which via drive shafts is connected with a longitudinal adjustment device of the rail pairs. For use with different track gages of the rail pairs, the carrier element is formed as multipart element with at least two carrier element parts shiftable against each other in transverse vehicle direction.

15 Claims, 4 Drawing Sheets

(56) References Cited

U.S. PATENT DOCUMENTS

| | | | | |
|---|---|---|---|---|
| 5,125,611 A * | 6/1992 | Cox | ............... | B60N 2/0232 |
| | | | | 248/420 |
| 5,129,702 A * | 7/1992 | Ervin | ............... | A47B 83/02 |
| | | | | 108/49 |
| 5,314,158 A * | 5/1994 | Mouri | ............... | B60N 2/0232 |
| | | | | 248/429 |
| 5,487,520 A * | 1/1996 | Mouri | ............... | B60N 2/0232 |
| | | | | 248/429 |
| 5,516,071 A * | 5/1996 | Miyauchi | ............... | B60N 2/0705 |
| | | | | 248/429 |
| 6,643,900 B2 | 11/2003 | Jährling | | |
| 6,729,598 B2 * | 5/2004 | Folliot | ............... | B60N 2/0232 |
| | | | | 248/671 |
| 7,070,155 B2 * | 7/2006 | Garrido | ............... | B60N 2/0232 |
| | | | | 248/424 |
| 8,678,337 B2 * | 3/2014 | Grunewald | ............... | B64D 11/0696 |
| | | | | 248/424 |
| 2001/0048058 A1 * | 12/2001 | Folliot | ............... | B60N 2/0232 |
| | | | | 248/429 |
| 2004/0094683 A1 * | 5/2004 | Garrido | ............... | B60N 2/0232 |
| | | | | 248/424 |
| 2006/0261625 A1 | 11/2006 | Kröner | | |
| 2008/0309137 A1 | 12/2008 | Kostin | | |
| 2009/0272869 A1 * | 11/2009 | Beneker | ............... | B60N 2/067 |
| | | | | 248/429 |
| 2010/0051776 A1 * | 3/2010 | Koga | ............... | B60N 2/0232 |
| | | | | 248/429 |
| 2010/0213342 A1 | 8/2010 | Schmale et al. | | |
| 2010/0242650 A1 * | 9/2010 | Koga | ............... | B60N 2/0232 |
| | | | | 74/416 |
| 2010/0264288 A1 * | 10/2010 | Thuleau | ............... | B60N 2/0232 |
| | | | | 248/429 |
| 2011/0031774 A1 * | 2/2011 | Koga | ............... | B60N 2/067 |
| | | | | 296/65.15 |
| 2011/0049157 A1 * | 3/2011 | Nakamura | ............... | B60R 7/04 |
| | | | | 220/345.1 |
| 2011/0139954 A1 * | 6/2011 | Ruess | ............... | B60N 2/067 |
| | | | | 248/429 |
| 2011/0278419 A1 * | 11/2011 | Sovis | ............... | B60N 2/0232 |
| | | | | 248/429 |
| 2012/0280104 A1 * | 11/2012 | Veen | ............... | B60N 2/0232 |
| | | | | 248/671 |
| 2013/0015313 A1 * | 1/2013 | Schmid | ............... | B60N 2/067 |
| | | | | 248/429 |
| 2014/0374563 A1 * | 12/2014 | Tuji | ............... | B60N 2/067 |
| | | | | 248/429 |
| 2016/0082863 A1 * | 3/2016 | Kostin | ............... | B60N 2/0232 |
| | | | | 248/429 |

FOREIGN PATENT DOCUMENTS

| | | |
|---|---|---|
| DE | 196 16 915 C1 | 10/1997 |
| DE | 200 04 346 U1 | 12/2000 |
| DE | 101 13 153 C1 | 4/2002 |
| DE | 102 13 377 A1 | 9/2002 |
| DE | 103 10 018 A1 | 9/2004 |
| DE | 10 2007 027 322 A1 | 12/2008 |
| DE | 10 2007 032 974 B4 | 4/2009 |
| DE | 20 2008 005 744 U1 | 10/2009 |
| DE | 10 2005 006 846 B4 | 11/2010 |
| DE | 10 2012 100 715 A1 | 1/2013 |
| WO | WO 2008/058603 A1 | 5/2008 |
| WO | WO 2008/140232 A1 | 11/2008 |
| WO | WO 2012/005416 A1 | 1/2012 |

* cited by examiner

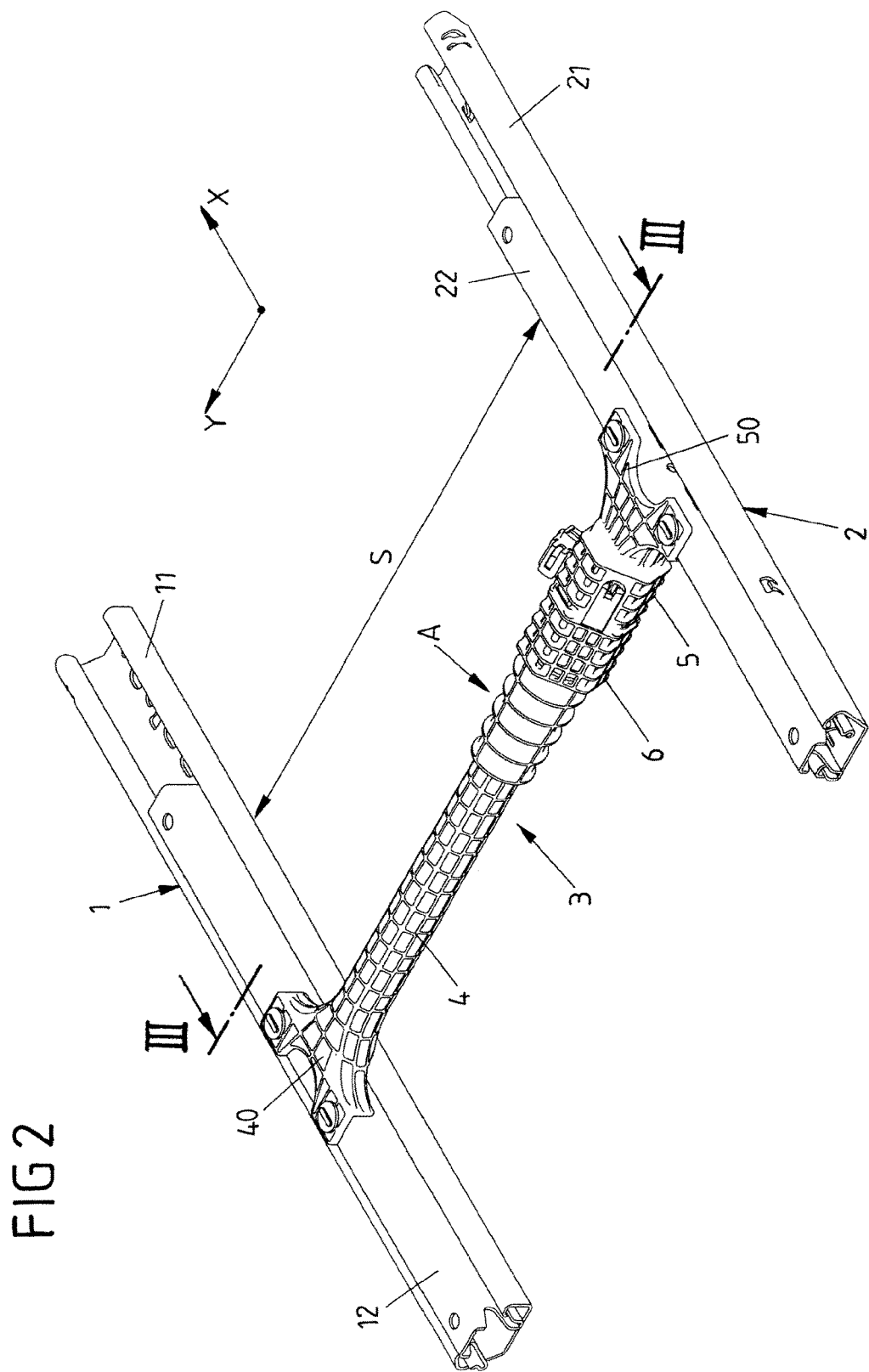

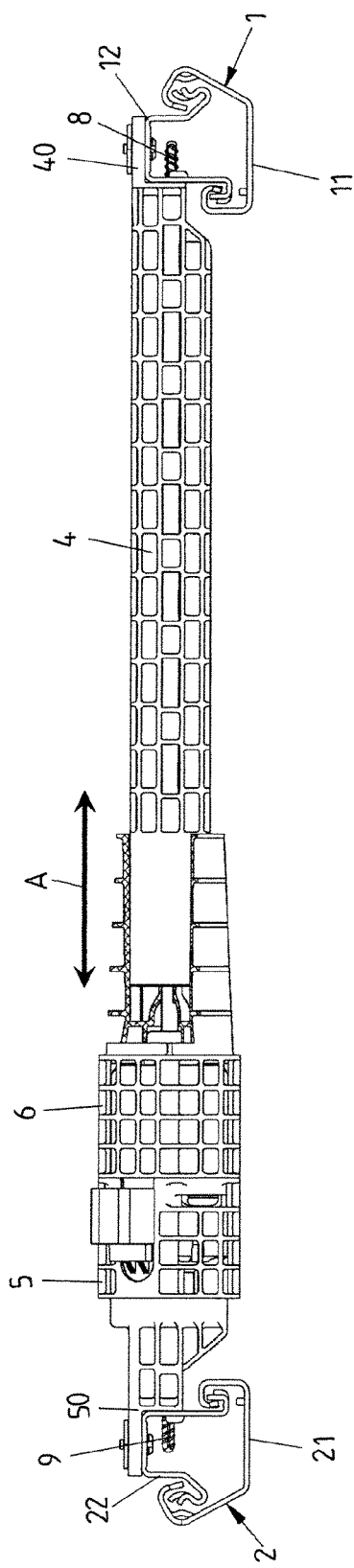

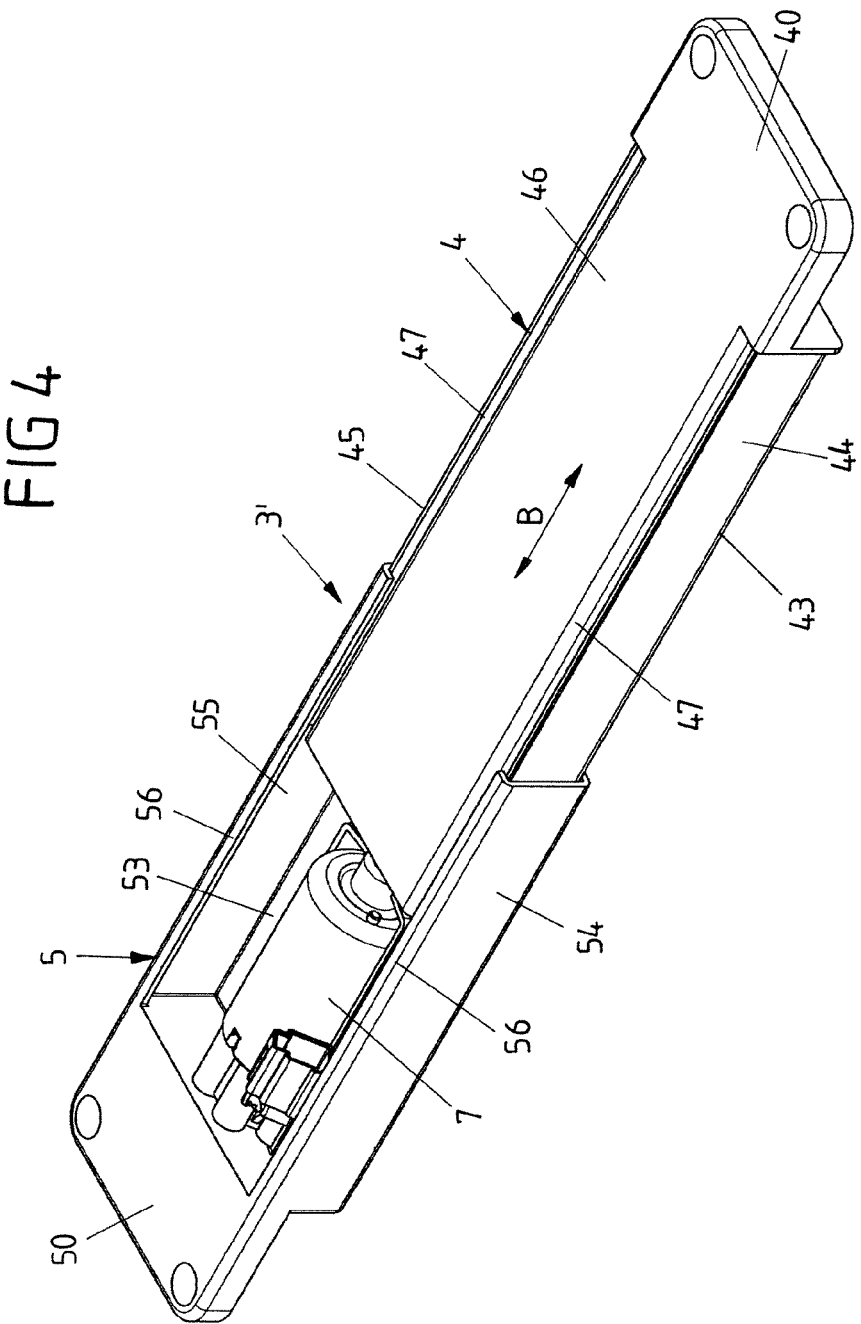

ADJUSTING SYSTEM FOR A VEHICLE SEAT

CROSS-REFERENCE TO A RELATED APPLICATION

This application is a National Phase Patent Application of International Patent Application Number PCT/EP2014/052572, filed on Feb. 11, 2014, which claims priority of German Patent Application Number 10 2013 202 327.8, filed on Feb. 13, 2013.

BACKGROUND

This invention relates to an adjustment system for a vehicle seat with two rail pairs aligned in longitudinal vehicle direction.

From DE 10 2007 027 322 A1 there is known a rail adjustment system for a motor vehicle seat with two rail pairs aligned parallel and at a distance to each other in longitudinal direction of the motor vehicle or in X-direction of the motor vehicle system of coordinates, which each consist of a stationary lower rail connected with the motor vehicle floor and an upper rail connected with the motor vehicle seat, which is longitudinally shiftably guided in the lower rail. The upper rails of the rail pairs are connected with each other via a holding element aligned in transverse vehicle direction or in Y-direction of the motor vehicle system of coordinates, which carries a drive motor which on both sides cooperates with spindle gear units of the rail pairs via rigid or flexible drive shafts for the longitudinal adjustment of the rail pairs. Via the drive shafts and the spindle gear units, a rotary movement of the drive motor is converted into a longitudinal adjustment of the respective upper rail against the corresponding lower rail of the rail pairs.

Since the holding elements are adjusted to the track gages or mutual distances of the rail pairs and are able to compensate track gage tolerances only in a small range of few millimeters, a plurality of holding elements and drive shafts is to be provided for the connection of motor vehicle seats of different manufacturers because of the different track gages of the rail pairs required for the motor vehicle seats, which renders the manufacture and stockkeeping of the holding elements much more expensive and complicates the assembly.

SUMMARY

Therefore, it is an object of the present invention to provide an adjustment system as mentioned above, which is usable for different track gages of rail pairs for the longitudinal adjustment of vehicle seats.

According to the invention, this object is solved with the features as described herein.

The solution according to the invention provides for the manufacture of a carrier element for accommodating an electric driving device for the longitudinal adjustment of vehicle seats, which is usable for different track gages of the rail pairs for accommodating the vehicle seat.

The at least two carrier element parts of the multipart carrier element according to the invention, which are shiftable against each other in transverse vehicle direction, thus can be inserted into rail pairs for vehicle seats with different track gage down into the centimeter range, so that all vehicle seats customary for the market, which require different track gages of the rail pairs, can be covered.

For adaptation to the respective track gage of the rail pairs in the manner of a rail adjustment system, the carrier element parts are shiftable against each other in an interlocking manner and have a closed or open profile.

A preferred embodiment of a closed profile of the carrier element is formed tubular, wherein the one tubular carrier element part is insertable into the other tubular carrier element part with variable depth for track gage compensation.

This type of connection of two carrier element parts ensures a high stability of the carrier element and an easy assembly, in that the end of the one carrier element part of the at least two carrier element parts inserted into each other for track gage compensation is connected with the one rail pair and the other carrier element part is moved to the other rail pair and connected with the same by utilizing the track gage compensation.

A preferred embodiment of an open profile of the carrier element consists of at least two carrier element parts, which have a box-like or rectangular cross-section and are inserted into each other in the manner of a drawer, wherein a first carrier element part has a closed rectangular profile or a rectangular profile open at the bottom, which includes an upper surface, two side faces and selectively a bottom surface as well as a flange portion for connecting the first carrier element part with one of the two rail pairs, and the second carrier element part has a rectangular profile open at the top, which consists of a bottom surface, an open upper surface, two side faces angled towards the upper surface, and a flange portion for connecting the second carrier element part with the other one of the two rail pairs.

Carrier element parts formed differently long provide for the connection of the electromotive driving device with the shorter one of the two differently long carrier element parts and hence a minimum load acting on the carrier element due to the arrangement of the electromotive driving device close to the connection of the carrier element to one of the two rail pairs.

In the case of differently long carrier element parts, the longer one of the two differently long carrier element parts has a terminal adjusting portion which is insertable into a counter-adjusting portion of the shorter one of the two differently long carrier element parts.

In a preferred embodiment, the carrier element part is formed in three parts with an open or closed profile and includes a first carrier element part connected with the one rail pair, a second carrier element part connected with the other rail pair, and a third carrier element part arranged between the first and the second carrier element part, which is shiftable with respect to the first carrier element part and is connectable with the second carrier element part via a plug-in or flange connection, wherein the electric driving device in particular is arranged in or at the middle, third carrier element part or between the second and the third carrier element part.

The three-part formation of the carrier element provides for the arrangement of the track gage compensation in the connection of the middle, third carrier element part with the first carrier element part, which is connected with the one rail pair, and for an easy insertion of a drive motor into the connection of the middle, third carrier element part with the second carrier element part which is connected with the other rail pair, wherein in a preferred embodiment the first carrier element part is longer than the second and third carrier element parts connected with each other.

A clip connection which connects the carrier element parts accommodating the electric driving device with each other provides for an easy, fast assembly and connection of the carrier element with the two rail pairs.

Preferably, the two carrier element parts of the two-part carrier element or the first and second carrier element parts of the three-part carrier element are connected with the one or other rail pair by means of terminal connecting flanges.

For weight minimization, the carrier element parts are made of a plastic material and include reinforcement ribs for increasing the stability, in particular for increasing the bending strength of the carrier element.

For transmitting the driving force of the electromotive driving device to the longitudinal adjustment devices of the rail pairs, rigid or in particular flexible drive shafts are connected with the electromotive driving device and for example each with a spindle nut of a spindle gear unit for the longitudinal adjustment of the rails.

BRIEF DESCRIPTION OF THE DRAWINGS

With reference to two exemplary embodiments illustrated in the drawing the idea underlying the invention will be explained in detail.

FIG. 2 shows a perspective representation of the completely mounted adjustment system.

FIG. 3 shows a section through the adjustment system along line III-III according to FIG. 2 with a side view of the carrier element with closed profile and integrated track gage compensation, which is arranged between two rail pairs.

FIG. 4 shows a perspective representation of a two-part carrier element with an open profile and integrated track gage compensation.

DETAILED DESCRIPTION

Figure 1:
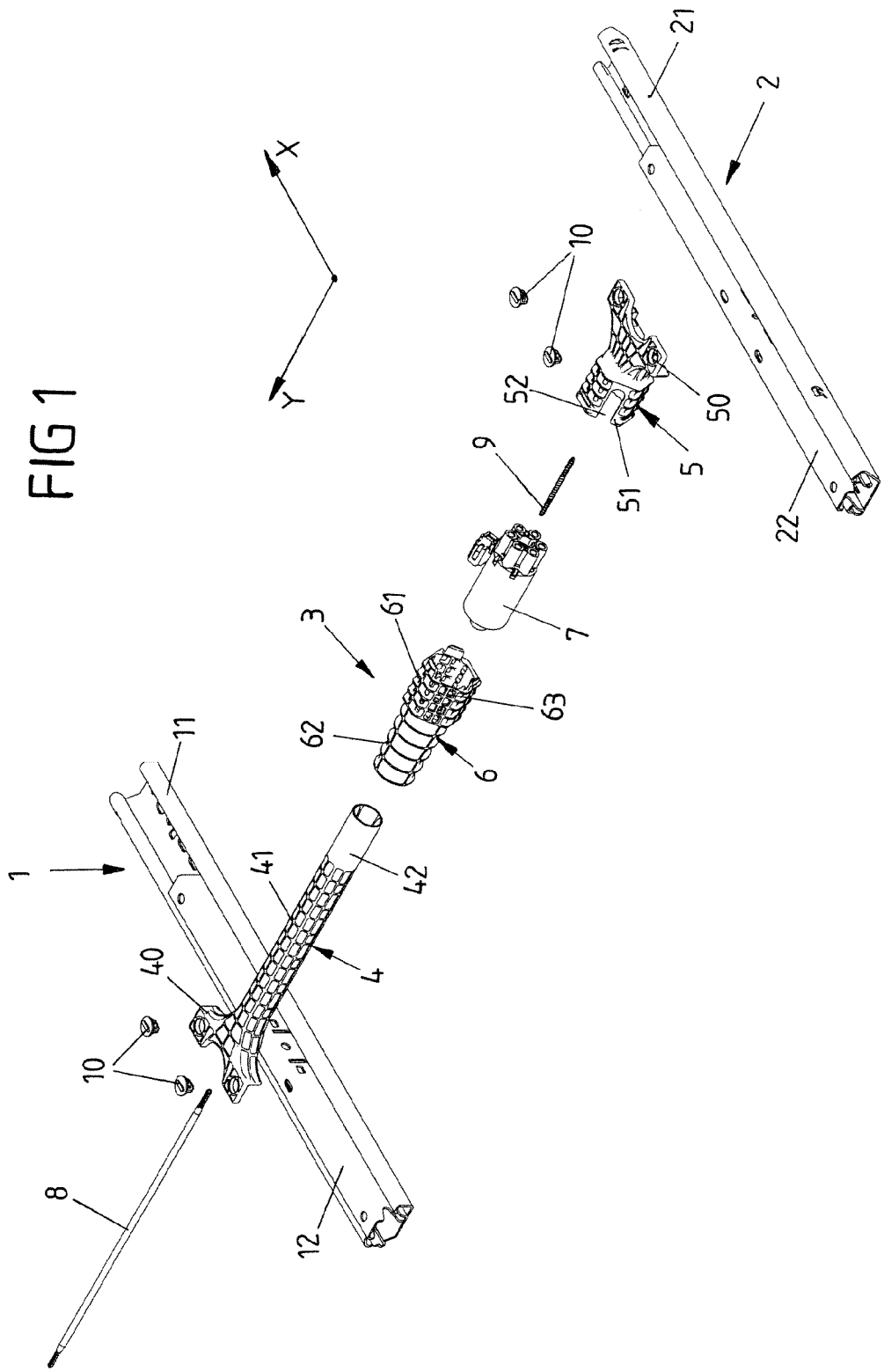
FIG. 1 shows a perspective exploded representation of the individual parts of an adjustment system for vehicle seats with a three-part carrier element with closed profile and integrated track gage compensation.

In a perspective exploded representation, FIG. 1 shows the parts of an adjustment system for a vehicle seat with rail pairs 1, 2 arranged opposite each other at the distance of a track gage S and extending parallel to each other, which each contain a lower rail 11, 21 firmly connected with the vehicle floor and an upper rail 12, 22 longitudinally shiftably mounted in the respective lower rail 11, 21 in X-direction of the X-Y system of coordinates schematically indicated in FIG. 1, to which rails the vehicle seat is attached.

With the upper rails 12, 22 of the rail pairs 1, 2 a three-part carrier element 3 is connected, which thus extends transversely to the orientation of the rail pairs 1, 2, i.e. in Y-direction of the system of coordinates. The three-part carrier element 3 includes a first, long carrier element part 4 which includes a retaining tab 40 connectable with the upper rail 12 of the first rail pair 1 by means of fastening screws, rivets or clips 10, a second, short carrier element part 5 which includes a retaining tab 50 connectable with the upper rail 22 of the second rail pair 2 by means of connecting screws, rivets or clips 10, and a third, middle carrier element part 6 arranged between the first and the second carrier element part 4, 5. All three carrier element parts 4, 5, 6 have a closed profile and are formed as tubular injection-molded plastic parts with rib and/or grating structures for increasing the stiffness.

The first carrier element part 4 is longer than the second and third carrier element parts 5, 6 put together and contains a rib structure portion 41 as well as an adjusting portion 42 which with a sliding fit is insertable into a counter-adjusting portion 62 of the third, middle carrier element part 6. The third carrier element part 6 includes a hollow cylindrical receiving portion 61 adjoining the counter-adjusting portion 62, into which a drive motor 7 can be inserted. By inserting a hollow cylindrical connecting portion 51 of the second carrier element part 5 into the hollow cylindrical receiving portion 61 of the third carrier element part 6, the second carrier element part 5 is connected with the third carrier element part 6 via a clip connection 52, 63.

Into the guide channel formed in the interior space of the tubular first carrier element part 4 a first drive shaft 8 is inserted and connected on the one hand with the drive motor 7 arranged in the third carrier element part 6 and on the other hand with the longitudinal adjustment device of the first rail pair 1. In the same way, a second drive shaft 9 is put through the guide channel formed in the tubular interior space of the second carrier element part 5 and connected on the one hand with the drive motor 7 and on the other hand with the longitudinal adjustment device arranged in the second rail pair 2.

The drive shafts 8, 9 can be formed both as rigid and as flexible drive shafts.

After connecting the retaining tab 40 of the first carrier element part 4 with the upper rail 12 of the first rail pair 1, the flange portion 50 of the second carrier element part 5 connected with the third carrier element part 6 can be moved to the fastening points of the upper rail 22 of the second rail pair 2, wherein the length of the carrier element 3 is adapted to the track gage S of the two rail pairs 1, 2 by the track gage compensation A arranged between the adjusting portion 42 of the first carrier element part 4 and the counter-adjusting portion 62 of the third carrier element part 6.

Alternatively, it is of course possible to first move the retaining tab 50 of the second carrier element part 5 with the fastening points of the upper rail 22 of the second rail pair 2 and subsequently the flange portion 40 of the first carrier element part 4 connected with the third carrier element part 6 via the track gage compensation A to the fastening points of the upper rail 12 of the first rail pair 2.

FIG. 2 shows the carrier element 3 in the assembled state between the two rail pairs 1, 2, wherein the length of the carrier element 3 without retaining flanges 40, 50 corresponds to the track gage S, i.e. the mutual distance of the rail pairs 1, 2 aligned parallel to each other, which in particular can be taken from the section along line III-III according to FIG. 2, which is shown in FIG. 3.

For adapting the length of the carrier element 3 to the track gage S, the adjusting portion 42 of the first carrier element part 4 engages into the counter-adjusting portion 62 of the third carrier element part 6 within the maximum possible track gage compensation A indicated by a double arrow in FIG. 3 to such an extent that the carrier element 3 has a length corresponding to the track gage S of the rail pairs 1, 2 spaced from each other.

The drive shafts 8, 9 guided in the guide channels of the carrier element parts 4, 5, 6 protrude into the cavity formed between the upper rails 12, 22 and lower rails 11, 21 of the rail pairs 1, 2 and for example are connected there with a worm gear of a spindle gear unit, which meshes with a spindle nut of the spindle gear unit. A rotary movement of the drive motor 7, which is arranged in the hollow cylindrical receiving portions 21, 61 of the second and third carrier element parts 5, 6, which are firmly connected with each other via the clip connection 63, 52, is transmitted to the spindle nut via the drive shafts 8, 9, which for the longitudinal adjustment of the vehicle seat is rolling on a threaded spindle connected with the lower rails 11, 21.

FIG. 4 shows a perspective representation of a two-part carrier element 3' with an open profile for a floating mount of two carrier element parts 4, 5.

The two-part carrier element 3' with open profile is composed of a first carrier element part 4 and a second carrier element part 5 accommodating the first carrier element part 4. Both carrier element parts 4, 5 have a box-like or rectangular cross-section and substantially are guided in each other along their entire length. The first carrier element part 4 has a rectangular profile selectively closed or open at the bottom, which includes an upper surface 46, two side faces 44, 45 and a bottom surface 43 or in the open form no bottom surface 43 as well as a flange portion 40 which is connected with one of the two rail pairs 1, 2 analogous to the representations in FIGS. 1 to 3.

The second carrier element part 5 accommodating the drive motor 7 includes an open upper surface, a bottom surface 53 and two side faces 54, 55 with angled upper edges 56 as well as a flange portion 50 for connecting the second carrier element part 5 with the other one of the two rail pairs 1, 2.

A guiding groove 47 at the upper edges of the first carrier element part 4, which are formed between the upper surface 46 and the side faces 44, 45, is enclosed by the angled upper edges 56 of the second carrier element part 5 to form a slideway between the first carrier element part 4 and the second carrier element part 5, so that the first carrier element part 4 is guided in direction of the double arrow B within the angled upper edges 56 of the second carrier element part 5 in the manner of a drawer system.

This second embodiment of the solution according to the invention provides for a larger track gage compensation, which with an open base surface 43 of the first carrier element part 4 reaches from the complete coverage of the open profile of the second carrier element part 5 up to an extraction of the carrier element part 4, which is given by a safety-relevant minimum engagement of the first carrier element part 4 into the second carrier element part 5.

The invention claimed is:

1. An adjustment system for a vehicle seat, the adjustment system comprising:
   two rail pairs aligned with respect to each other along a longitudinal direction, each rail pair comprising each of a longitudinal adjustment device,
   a carrier element coupled to the two rail pairs and extending along a transverse direction in between the two rail pairs,
   an electromotive driving device carried and supported by the carrier element,
   drive shafts configured to connect the electromotive drive device to the longitudinal adjustment devices of the rail pairs,
   wherein the carrier element comprises at least two carrier element parts being rigidly formed and supporting the electromotive driving device on both of the two rail pairs such that the electromotive driving device is located between the two rail pairs, a first of the at least two carrier element parts comprising a first adjusting portion and a second of the at least two carrier element parts comprising a second adjusting portion slidably receivable on the first adjusting portion such that the second of the at least two carrier element parts is slidably guided on the first of the at least two carrier element parts along the transverse direction for adjusting the length of the carrier element along the transverse direction such that the length of the carrier element can vary before the carrier element is coupled to the two rail pairs.

2. The adjustment system according to claim 1, wherein the at least two carrier element parts have a closed profile.

3. The adjustment system according to claim 2, wherein the at least two carrier element parts are tubular.

4. The adjustment system according to claim 1, wherein the at least two carrier element parts have an open profile.

5. The adjustment system according to claim 1, wherein the at least two carrier element parts have different lengths when viewed along the transverse direction.

6. The adjustment system according to claim 5, wherein the electromotive driving device is connected with a carrier element part of the at least two carrier element parts having a shorter length than another carrier element part of the at least two carrier element parts.

7. The adjustment system according to claim 6, wherein the other carrier element part includes a terminal adjusting portion which is insertable into a counter-adjusting portion of the carrier element part of the at least two carrier element parts having a shorter length.

8. The adjustment system according to claim 1, wherein two of the at least two carrier element parts are each connected with an associated rail pair of the two rail pairs via terminal connecting flanges.

9. The adjustment system according to claim 1, wherein the at least two carrier element parts are made of a plastic material and include reinforcement ribs.

10. The adjustment system according to claim 1, wherein the drive shafts are formed flexible.

11. An adjustment system for a vehicle seat, the adjustment system comprising:
    two rail pairs aligned with respect to each other along a longitudinal direction, each rail pair comprising each of a longitudinal adjustment device,
    a carrier element coupled to the two rail pairs and extending along a transverse direction in between the two rail pairs,
    an electromotive driving device carried by the carrier element,
    drive shafts configured to connect the electromotive drive device to the longitudinal adjustment devices of the rail pairs,
    wherein the carrier element comprises at least two carrier element parts, a first of the at least two carrier element parts comprising a first adjusting portion and a second of the at least two carrier element parts comprising a second adjusting portion slidably receivable on the first adjusting portion such that the second of the at least two carrier element parts is slidably guided on the first of the at least two carrier element parts along the transverse direction for adjusting the length of the carrier element along the transverse direction such that the length of the carrier element can vary before the carrier element is coupled to the rail pairs, wherein the at least two carrier element parts have a box-like or rectangular cross-section and are inserted into each other in the manner of a drawer, wherein the first of the at least two carrier element parts has a closed rectangular profile or a rectangular profile open at the bottom, which includes an upper surface, two side faces and selectively a bottom surface as well as a flange portion for connecting the first carrier element part with one of the two rail pairs, and the second of the at least two carrier element parts has a rectangular profile open at the top, which consists of a bottom surface, an open upper surface, two side faces angled towards the upper surface, and a flange portion for connecting the second carrier element part with the other one of the two rail pairs.

12. An adjustment system for a vehicle seat, the adjustment system comprising:

two rail pairs aligned with respect to each other along a longitudinal direction, each rail pair comprising each of a longitudinal adjustment device, a carrier element coupled to the two rail pairs and extending along a transverse direction in between the two rail pairs, an electromotive driving device carried by the carrier element, drive shafts configured to connect the electromotive drive device to the longitudinal adjustment devices of the rail pairs, wherein the carrier element comprises at least two carrier element parts, a first of the at least two carrier element parts comprising a first adjusting portion and a second of the at least two carrier element parts comprising a second adjusting portion slidably receivable on the first adjusting portion such that the second of the at least two carrier element parts is slidably guided on the first of the at least two carrier element parts along the transverse direction for adjusting the length of the carrier element along the transverse direction such that the length of the carrier element can vary before the carrier element is coupled to the rail pairs, wherein the carrier element comprises three carrier element parts, wherein the first of the carrier element parts is connected with a first of the two rail pairs, a third of the carrier element parts is connected to a second of the two rail pairs, and the second of the carrier element parts is arranged between the first and the third carrier element part.

13. The adjustment system according to claim 12, the second and the third carrier element parts are connected with the electric driving device or accommodate the electric driving device.

14. The adjustment system according to claim 13, wherein the second and the third carrier element parts accommodating the electric driving device are connected with each other via a clip connection.

15. The adjustment system according to claim 12, wherein the first carrier element part is longer than the second and the third carrier element part.

* * * * *